US006735891B2

(12) United States Patent
Pallas Moreno et al.

(10) Patent No.: US 6,735,891 B2
(45) Date of Patent: May 18, 2004

(54) LOCK AND RETENTION ELEMENTS DESTINED FOR PUBLIC WORKS AND SIMILAR MACHINES

(75) Inventors: Jorge Pallas Moreno, El Masnou (ES); Nil Vallve I Bertran, Cabrils (ES); Juan Carlos Merino Senovilla, Valladolid (ES); Ma del Rosario Fernandez Martinez, Alcobendas (ES)

(73) Assignee: Metalogenia, S.A., Premia de Mar (ES)

( * ) Notice: Subject to any disclaimer, the term of this patent is extended or adjusted under 35 U.S.C. 154(b) by 0 days.

(21) Appl. No.: 09/872,792

(22) Filed: Jun. 1, 2001

(65) Prior Publication Data
US 2002/0006318 A1 Jan. 17, 2002

Related U.S. Application Data (63) Continuation of application No. PCT/ES99/00389, filed on Nov. 30, 1999.

(30) Foreign Application Priority Data

Dec. 2, 1998 (ES) .................................................. 9802527

(51) Int. Cl.$^7$ .................................................. E02F 9/28
(52) U.S. Cl. ......................................... 37/457; 411/512
(58) Field of Search ............................. 403/378, 379.4; 411/351, 51.3, 512; 37/457

(56) References Cited

U.S. PATENT DOCUMENTS

| | | | | |
|---|---|---|---|---|
| 3,520,224 A | * | 7/1970 | Hensley | |
| 3,685,178 A | * | 8/1972 | Ratkowski | .................. 37/457 |
| 3,704,861 A | * | 12/1972 | Glaesener | |
| 4,446,638 A | * | 5/1984 | Novotny | |
| 4,481,728 A | * | 11/1984 | Mulder | |
| 4,811,505 A | * | 3/1989 | Emrich | |
| 4,823,487 A | * | 4/1989 | Robinson | |
| 5,469,648 A | * | 11/1995 | Jones | |
| 5,938,878 A | * | 8/1999 | Hurley | |
| 6,025,067 A | * | 2/2000 | Fay | |
| 6,054,005 A | * | 4/2000 | Hurley | |
| 6,336,487 B1 | * | 1/2002 | Teratani | |
| 6,348,512 B1 | * | 2/2002 | Adriani | |

* cited by examiner

Primary Examiner—Flemming Saether
(74) Attorney, Agent, or Firm—Darby & Darby (57) ABSTRACT

The improvements apply to lock and retention elements for public works and similar machines of the type incorporating a combination of one or various metal elements with one or various blocks of elastomer material, irrespective of whether they are joined to the former or not, in which the block of elastomer material is made up of an elastic structural material containing multiple internal cavities in the form of closed cells, that are for the most part separated from each other, and which contain a gas that allows the elastomer block to be compressed and reduced in volume during the compression that metal pieces exercise on the elastomer block, showing minimum transverse expansions.

22 Claims, 14 Drawing Sheets

PRIOR ART

FIG. 12

PRIOR ART

FIG. 12 BIS

PRIOR ART

FIG. 13

PRIOR ART

FIG. 14

PRIOR ART

PRIOR ART

FIG. 24

PRIOR ART

FIG. 25

PRIOR ART

FIG. 26

PRIOR ART

LOCK AND RETENTION ELEMENTS DESTINED FOR PUBLIC WORKS AND SIMILAR MACHINES

This is a continuation of international application no. PCT/ES99/00389 filed Nov. 30, 1999, the entire disclosure of which is hereby incorporated by reference.

FIELD OF THE INVENTION

The intention of this invention is to make improvements to locking and retention systems for public works, mining and similar machinery which offer interesting new and inventive characteristics with regard to what is known up to the present.

BACKGROUND OF THE INVENTION

Machines for public works, mining and similar projects have the function of removing and loading masses of land and stones. They are fitted with an active edge known as a blade, on which is mounted a number of units designed to penetrate the terrain. These units are usually a series of adapters (these are either welded, bolted or mechanically fixed to the blade) and they have pieces known as points or teeth attached to them, which have the function of penetrating the earth. There are various systems to join the teeth to the adapter, and all of these have a different attachment or locking system. The locking system must ensure that the tooth is perfectly mounted on the nose of the adapter, resisting all forces to which the unit (tooth-locking-adapter) is exposed. The locking system may be formed by a single body (fully integrated) or by various bodies (a pin incorporating retainers or tensors). The pins have different shapes and constitutions. There are pins that are made from metal only, although the most usual ones are those made from a combination of metal and a rubber like material.

The lock elements made up of a combination of metal and a rubber-like material, as opposed to the locking elements made from metal only, are easier to assemble and dismantle, and they offer a better possibility to give tension to the unit and are also good at absorbing moderate forces. But they also have considerable disadvantages that cause breakage and the loss of these elements. These disadvantage are the influence of the temperature on the mechanical characteristics of the rubber like material and the possible deterioration of this due to the absorbing of oils and greases, although the main disadvantage is the high transverse expansion that the rubber-like material undergoes when it is compressed, giving it a tendency to get torn. This implies the imminent loss of the pin.

Until now the locking systems made from a combination of metal and rubber-like material have used compact (or solid) elastomers. A compact (or solid) elastomer is one that is made up of a single phase.

Normally natural rubbers are used. These offer a good level of resistance to traction, abrasion, tearing and fatigue as well as a high resilience. Their limitations include a moderate maximum service temperature (between 70° and 90°) and their sensitivity to oxidation and attack by ozone. As in the case with all non-polar rubbers, they swell appreciably when they come into contact with hydrocarbonate solvents. When they are swollen, their mechanical resistance is considerably reduced and increases their susceptibility to degradation. The property that characterises the rubber is its high elasticity, in other words, its capacity to undergo considerable deformations under relatively weak forces and to recuperate quickly its original shape and dimensions when the deforming force ceases to act upon it, replacing the energy stored during the deformation.

The inconvenience of undergoing a high transverse expansion when it is compressed is common to all compact elastomers that have been used up to now in lock or retention elements.

Figure 18:
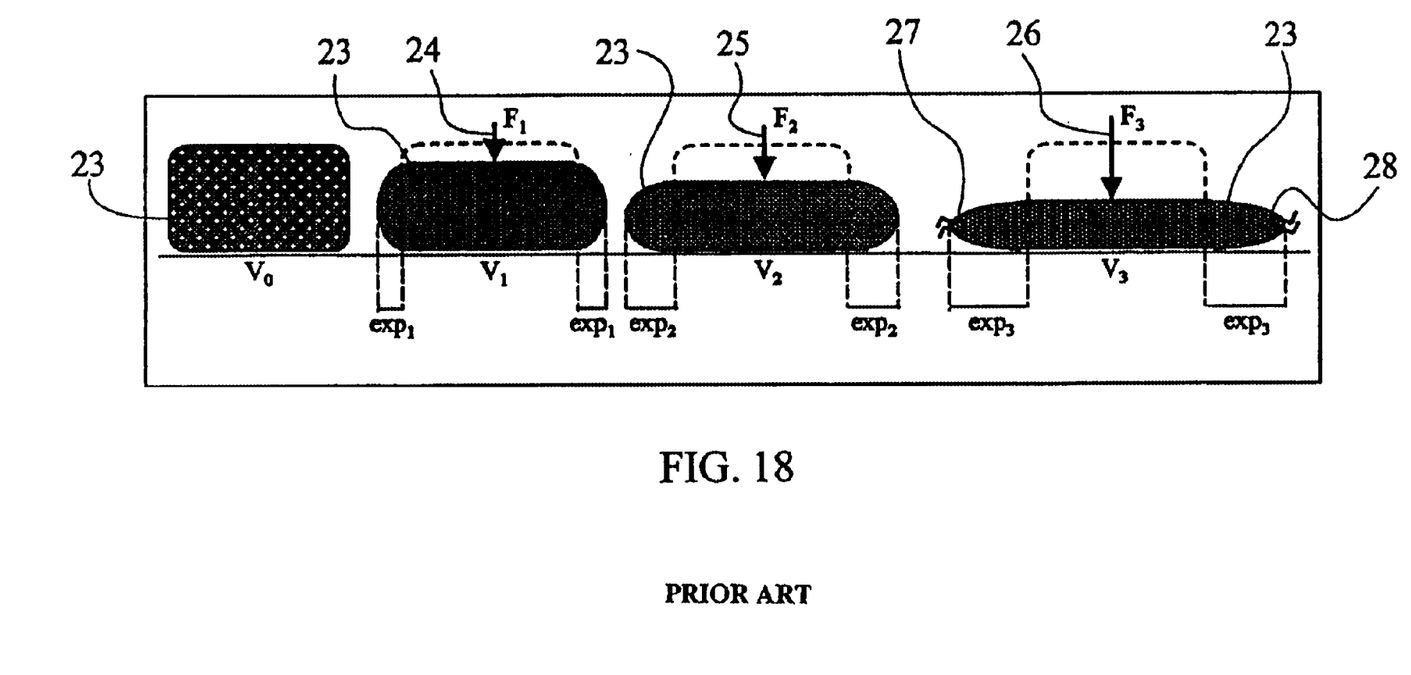
FIG. 18 shows a diagram of the successive compression phases for a block of rubber-type material used according to the state of the technique.

Because of this high capacity of transverse expansion, the compact elastomer used in pins deteriorates easily as a result of friction or pinching when the pin is being mounted and also when the unit is working. As shown in FIG. 18, when a force $F_1$ is applied to the block of compact elastomer, this responds by compressing itself and showing a transverse expansion (the sheet is made convex). This happens because the compact elastomer maintains constant its volume even though it is subject to forces. If a force F2, greater than F1, is applied, the transverse expansion increases. If even greater forces (F3) are applied continuously, the compact elastomer will continue to expand until it reaches a limit where it ends up breaking. The volume is maintained constant in the four representative states, continually increasing the transverse expansion undergone.

The main problem of the transverse expansion, caused by the maintenance of the same volume on applying a force, causes the compact elastomer to interfere with other bodies (the internal walls of the pinhole, the internal walls of the tooth and the nose of the adapter) and it ends up being subjected to friction, pinching, shearing and folding which inevitably cause it to break. The breakage of the compact elastomer leads to the loss of the tooth. For this reason it is very important for the locking system to be attached strongly and to offer resistance to the forces suffered by the unit.

Figure 1:
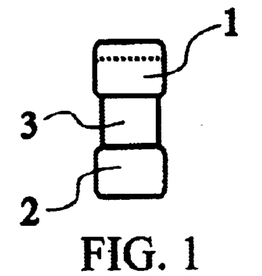
FIGS. 1, 2, 3, 4 and 5 show views of a pin-like retention device to which these improvements can be applied.
Figure 2:
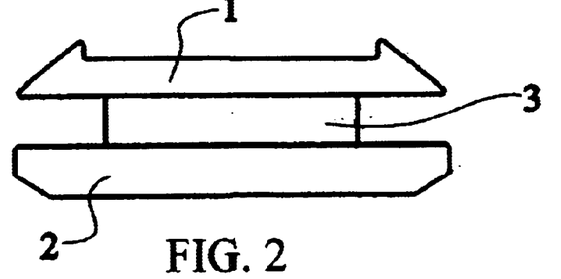
Figure 3:
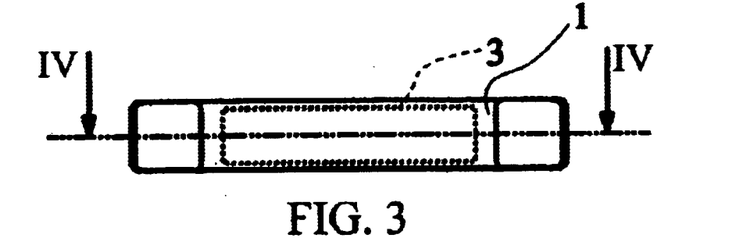
Figure 4:
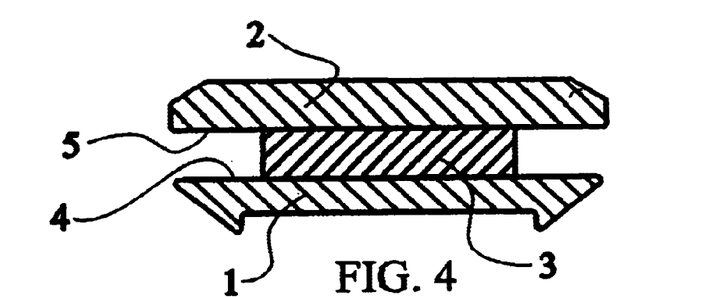
Figure 5:
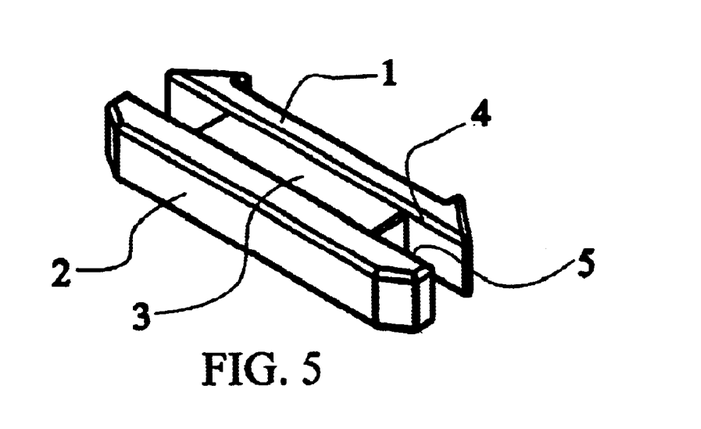
Figure 6:
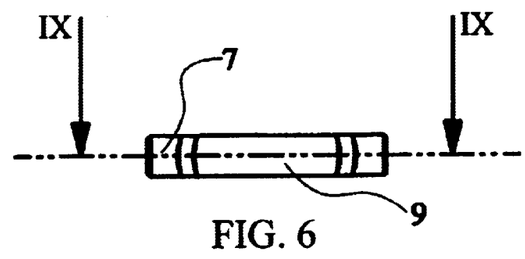
FIGS. 6, 7, 8, 9 and 10 show views of another example of a pin to which these improvements can be applied.
Figure 7:
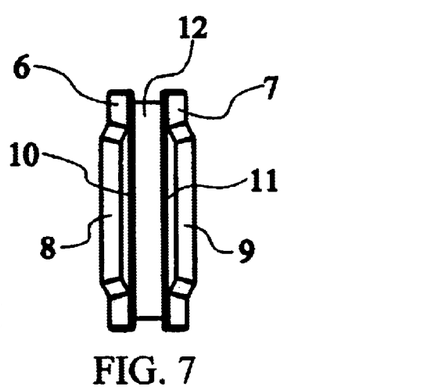
Figure 8:
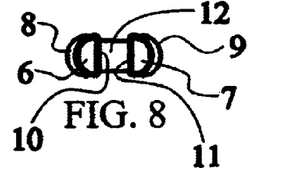
Figure 9:
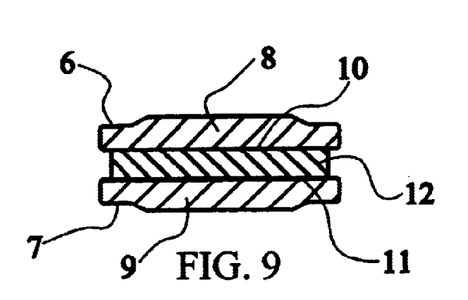
Figure 10:
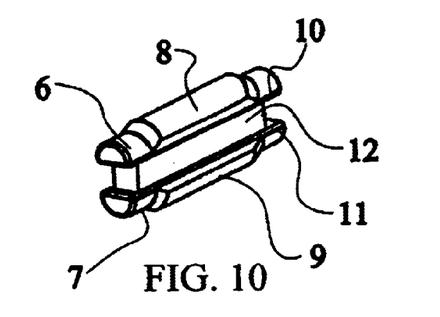
Figure 11:
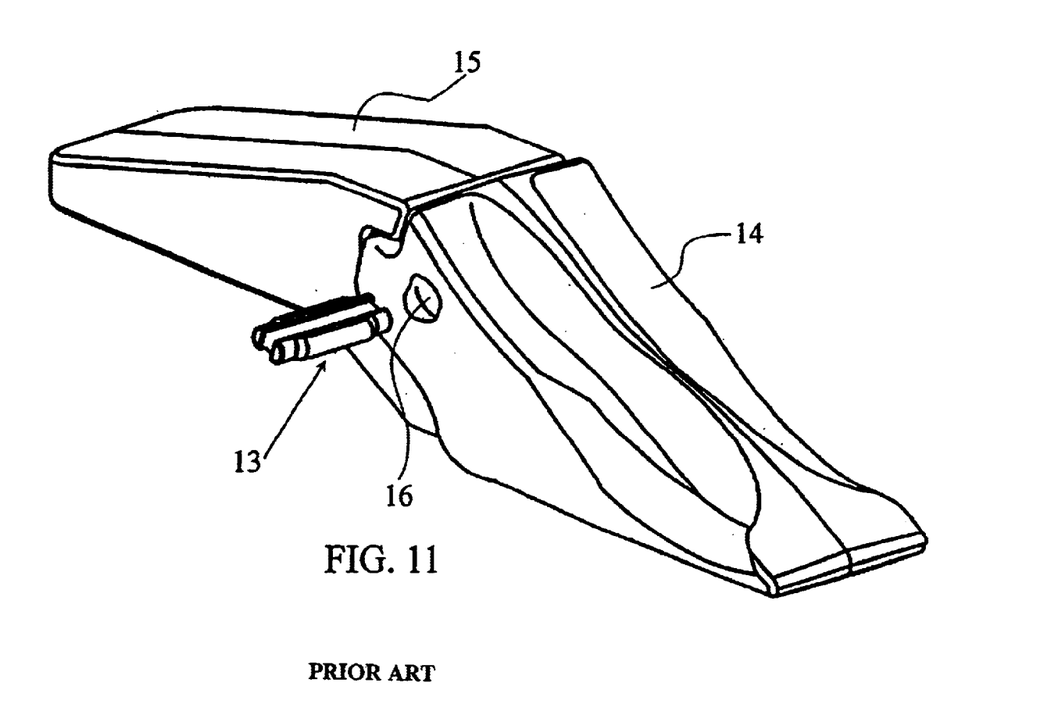
FIG. 11 shows a perspective view of the positioning of the horizontal sandwich type pins.
Figure 12:
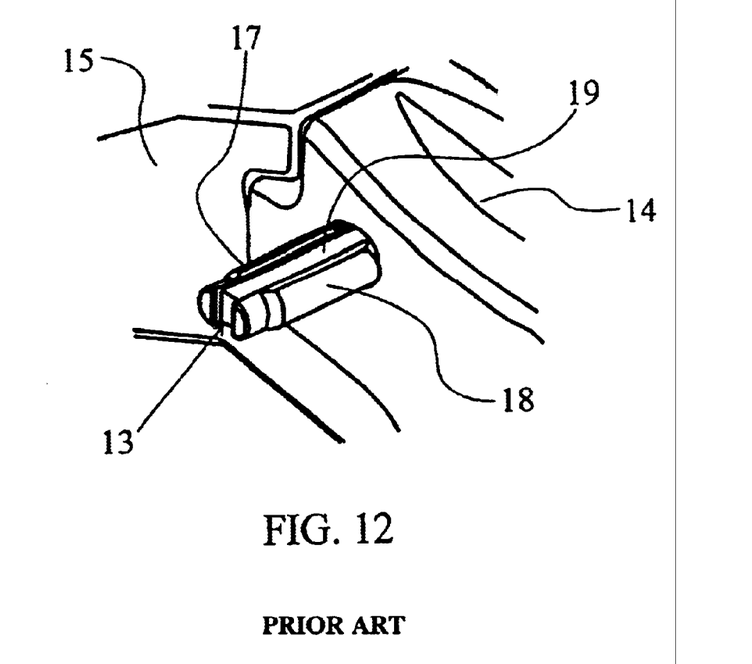
FIGS. 12, 13 and 14 each show views of the positioning of the cotter pin in its notch and a transverse section of this, carried out according to the present state of the technique.
Figure 13:
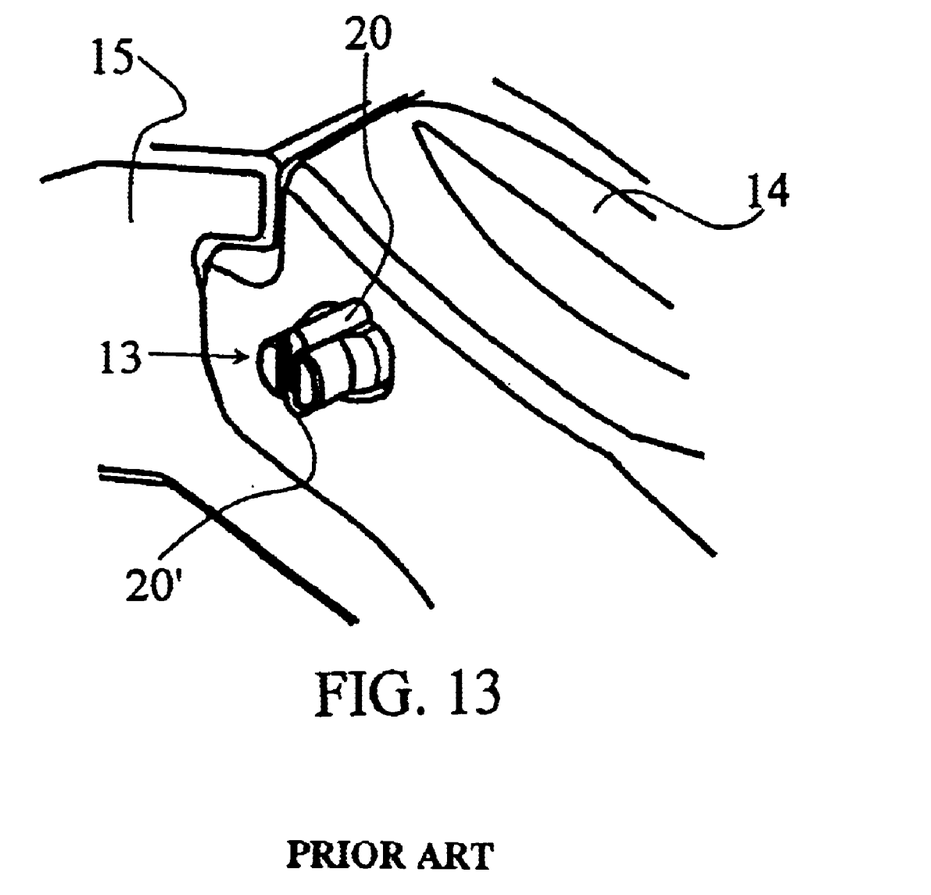
Figure 14:
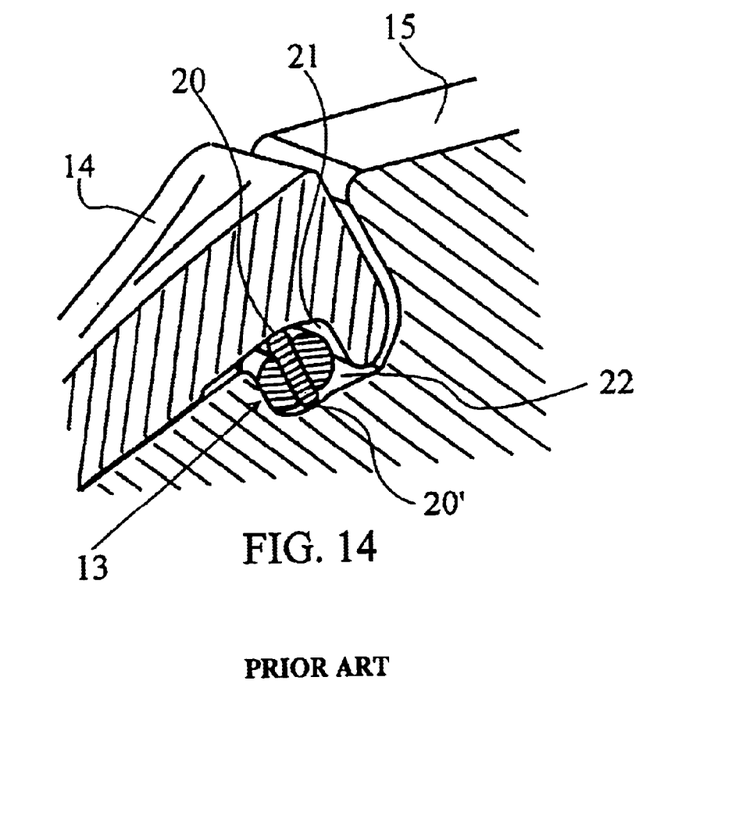

In FIG. 11 we can see a unit made up of a tooth, an adapter and a metal-rubber-metal-type laterally introduced "sandwich" pin. In FIGS. 12, 12(BIS) and 13 we can see how the mounting of this pin evolves. In FIG. 12 the end of the pin is placed in its pinhole and it is then struck with a hammer. The pin penetrates the pinhole compressing the rubber, which joins the metal parts; the end parts made from metal are separated thus forcing the elastomer, which frequently tends to come unstuck and get torn (FIG. 12 (BIS)). As the pin is introduced the rubber continues to compress, giving rise to a considerable inferior and superior transverse expansion which interferes with the external wall of the tooth and which inevitably causes the rubber to deteriorate (FIG. 13). Once mounted (FIG. 14), the rubber remains in a deformed state and it interferes with the internal wall of the nose of the adapter and the internal wall of the tooth. As the unit is subjected to forces, the rubber deteriorates more and more until it breaks.

In order to try to minimise the inconvenience of the transverse expansions that interfere with other bodies, slight modifications have been made to the design of the elastomer elements; but these have not managed to solve the problem.

Figure 23:
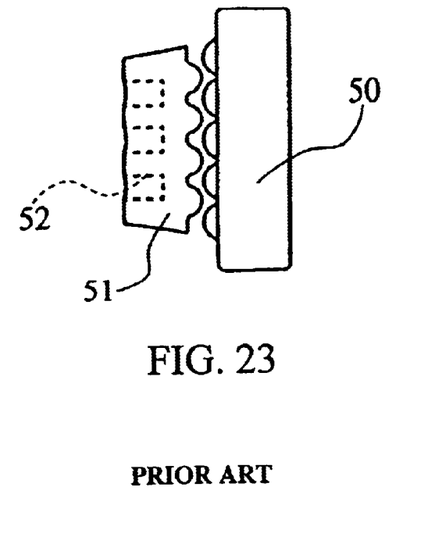
FIGS. 23, 24, 25 and 26 each show versions of lock elements according to the state of the technique in which modifications have been made to reduce the effect of the transverse expansions. The improvements of this invention could be applied to these elements, making it unnecessary to carry out perforations or any other type of modification that could affect the mechanical response of these elements.
Figure 24:
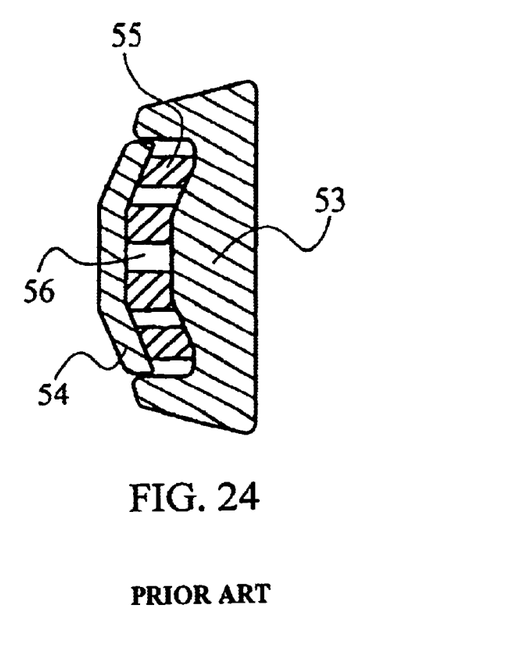
Figure 25:
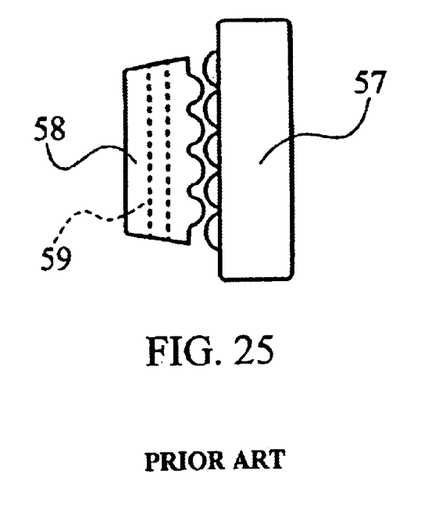
Figure 26:
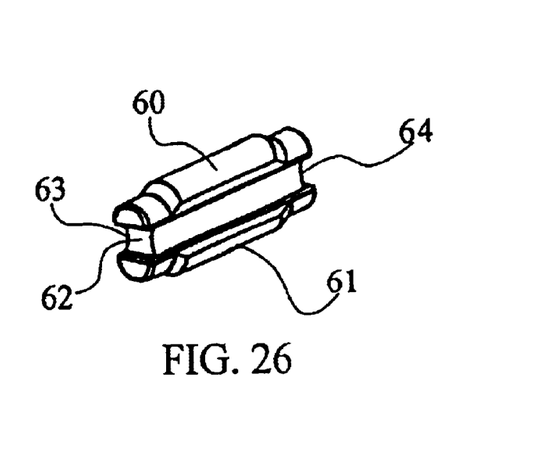

The modifications carried out to try to minimise transverse expansion are based on the extraction of a part of the elastomer material. Among these modifications we can highlight the perforation of the material and the concave shapes of the sheets. FIG. 23 shows a retainer/tensor with three needles arranged vertically. In FIG. 24 the passing needles are arranged laterally in a "sandwich" type pin. In FIG. 25 the retainer/tensor is pierced vertically and in FIG. 26 a "sandwich" type pin shows a concave elastomer sheet.

The main problem of the perforated elastomers is that earthen materials known as fines enters the holes. These fines are compacted and prevent the deformation caused by the pressure becoming absorbed by the holes, causing this to be transmitted once again to the ends and it expands transversely, in the same way that a non-perforated elastomer would respond. In addition to this, it also weakens the pin.

The solution of using elastomers with concave shapes does not solve the problem of the transverse expansion either. For large compressions, such as those that take place during the mounting of the pin, the elastomers become deformed and end up interfering with other bodies. In addition, the fact that they are concave means that the pin is weaker, and since it has less elastomer material, its elastic response is lower than that of a pin with a non-concave elastomer.

U.S. Pat. No. 5,731,359 refers to vibration-absorbing elements comprising a foamed thermoplastic polyamide elastomer consisting in a block aimed at holding conduction pipes mainly for the braking system in automobiles, having a carrier, plate with a threaded bolt received on a bore of the vibration-absorbing block, which has a pore size which decreases gradually from the inside towards the outer surface, terminating in a smooth closed surface.

UK patent application 2 150 667 refers to a plastic shock absorber which has a plastic casing holding a closed cell foamed plastic and having a piston acting on said foamed mass.

U.S. Pat. No. 4,678,707 discloses a vibration damping composite laminate comprising two layers of a metal and a layer of a viscoelastic polymer composition, having said damping composite the capacity to be electrically welded to a metal structure.

SUMMARY OF THE INVENTION

The inventors have carried out tests to try find a solution to the aforementioned problems, having found an efficient technical solution on introducing compressible (cellular) elastomers preferably made of cellular polyurethane as a base for the bodies to be introduced in the retention and lock elements used in machinery for public works, mining, and the like. In the experiments that were carried out, it was discovered that for this application, the indicated elastomers combine a large reversible deformation with a very low transverse expansion, making them ideal for applications where the space that surrounds the material is limited. Thanks to these characteristics the behaviour of the lock elements during the mounting and during the time of operation is excellent. In addition, the implementation of compressible (cellular) elastomers avoids design modifications such as special shapes or perforations, thereby simplifying manufacturing.

The application of the compressible (cellular) elastomers, which preferably will be made of cellular polyurethane, will usually take place in the form of blocks of this material, of the appropriate dimensions, associated with metal receiving parts, which together form a retention device. The blocks of elastomer material will provide the elastic properties to the locking and retention elements. The application of the blocks may take place either through adherence of the previously formed material or by moulding and polymerisation of the actual components of the polyurethane, together with the metal pieces that form the retention element.

BRIEF DESCRIPTION OF THE DRAWINGS

To allow a better understanding, we have attached as an explanatory but unrestricted example, a series of drawings that refer to the construction of the locking and retention elements improved in keeping with the aspects this invention.

FIG. 12 (BIS) shows an intermediate phase when the ends widen as the pin is being positioned.

DETAILED DESCRIPTION OF THE INVENTION

In FIGS. 1 to 5 we can see, that a lock element that conforms to the state of the technique and to which this invention is applied, can be formed by a pin with metal pieces 1 and 2 between which there is a block 3 of an elastomer that will usually be adapted by vulcanisation or by the adhering of the metal pieces, 1 and 2 respectively, to the internal sides 4 and 5.

In another example which is shown in FIGS. 6 to 10, the locking device, which is also in the shape of a pin, has two metal pieces 6 and 7, which in this case are symmetric and which are fitted with intermediate salients on their external sides 8 and 9, receiving a block 12 of a elastomer on the inside, in opposition between the internal sides 10 and 11 of the pieces 8 and 9.

FIG. 23 shows a version of the retention element according to the state of the technique, formed by a metal base 50 and a block of rubber-like elastomer 51, in which various holes such as those indicated by 52 have been made so as to allow the compensation of the transverse deformation produced by this material, which is of the type currently known, to take place. FIG. 24 shows another version based on two metal pieces 53 and 54 with an intermediate elastomer block 55, with passing holes 56 for the same purpose. Likewise, in FIG. 25 there is a similar variant to that in FIG. 23, in which a metal piece 57 bears the action of an elastomer block 58 fitted with a longitudinal hole 59 with the same purpose as that mentioned above. Also in FIG. 26 we can see a retention element formed by the two opposing metal pieces 60 and 61, in which the block of elastomer material 62 shows lateral concave sides such as those indicated by 63 and 64, which are also intended to allow the transverse deformation of the elastomer. All these technical measures to avoid the transverse deformation, corresponding to the state of the technique, are improved by the application of this invention.

The use of these lock elements occurs in the manner shown in FIG. 11, in such a way that the pin unit 13, for example that of the type shown in FIGS. 6 to 10, is positioned between the teeth 14 and the adapter 15 when it is placed in the passing holes (only the hole 16 has been shown) that have been made for this purpose.

As we can see in FIGS. 12, 12 (BIS), 13 and 14 the introduction of the pin 13 in the holes designed to receive it produces a compression of the metal pieces 17 and 18 that are integrated into the pin, which act by compressing the block of rubber-like material 19 so that this expands laterally thereby giving rise to the laterally salient zones 20 and 20. These salient zones create problems because of their interference with the external wall of the tooth and the opposite sides 21 and 22 of the notch into which the pin is placed, which causes dross and cracks in the elastomer material, as well as shearing forces, which may put the integrity of the elastomer block at risk, and consequently jeopardise the proper functioning of the pin.

Figure 15:
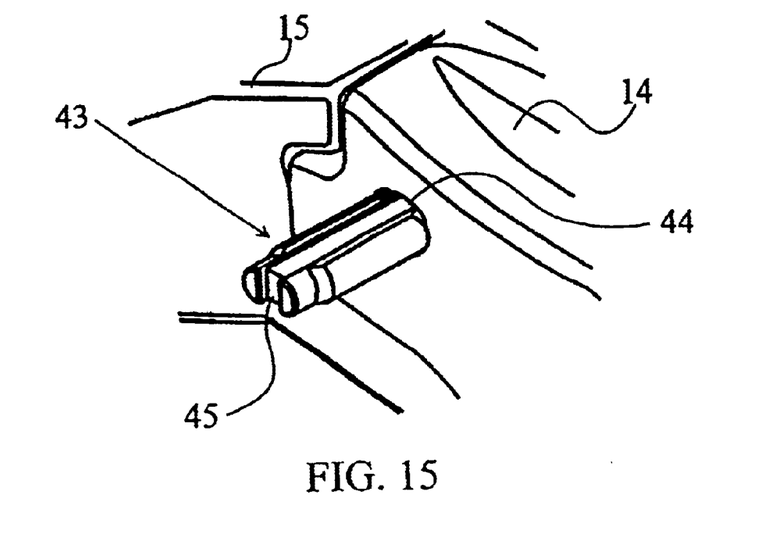
FIGS. 15, 16 and 17 each show views of the positioning and a perspective with a partial section of a pin, which incorporates the improvements expressed herein.
Figure 16:
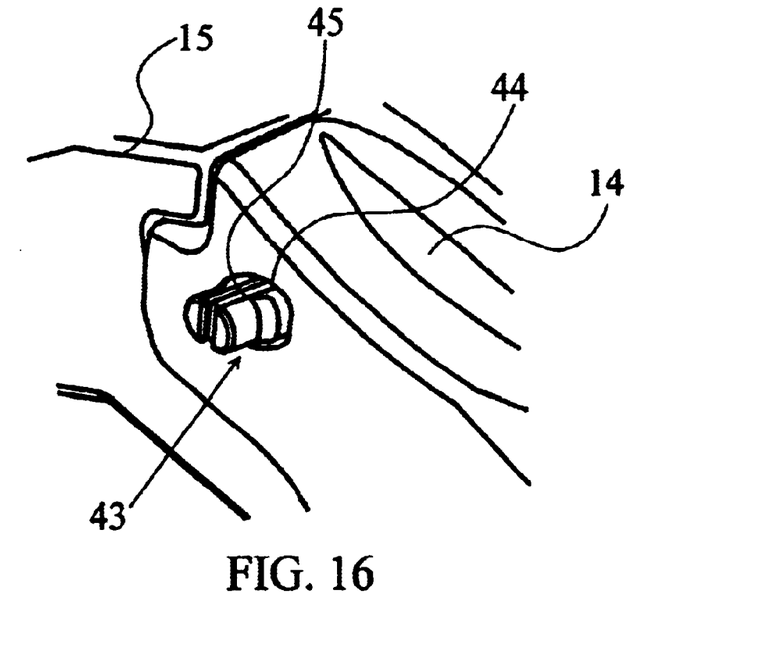
Figure 17:
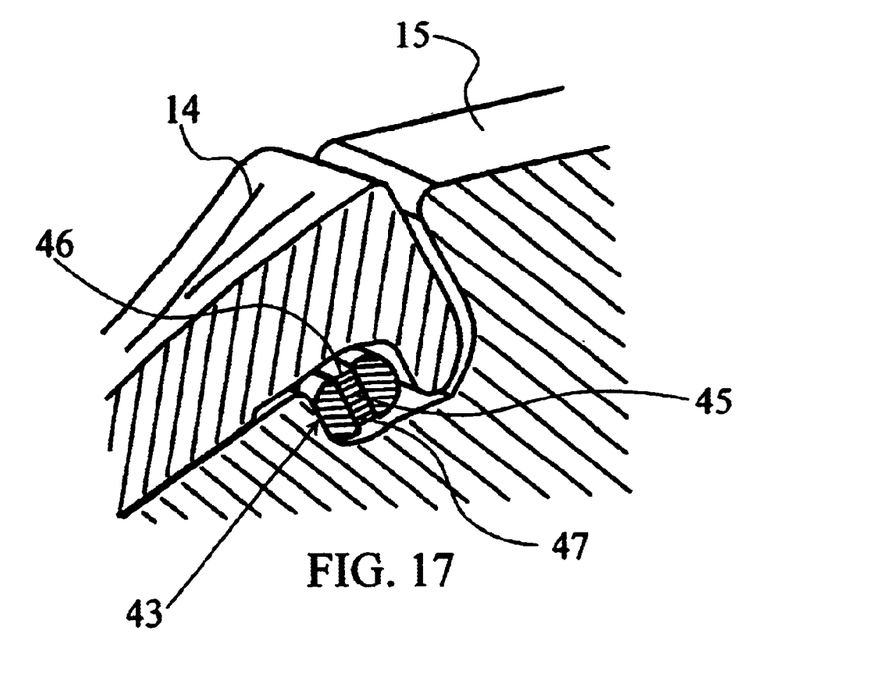

In FIGS. 15, 16, and 17 we can see the behaviour of a retention element that incorporates the improvements referred to herein. A pin 43 is placed in the hole 44, and exerts a compression on the elastomer 45 the lateral sides of which 46 and 47 hardly suffer any deformation at all.

To offer a better explanation of the deformation that a elastomer block of rubber like material undergoes, FIG. 18 shows a diagram of a section of a block 23 to which the compression force is applied according to the vector 24, which produces the compression of this block, thereby provoking lateral expansions such as those indicated by exp1, which will be function of force F1. In the event of an increase in the compression force, represented by the vector 25, the deformations on both sides would be represented by exp2, and this would also be the same in both cases. With the continuing compression force on the elastomer block 23, a situation is reached where this force, represented by the vector 26, produces expansions exp3, on both sides resulting in the breakage in the extreme or distal zones 27 and 28 of the block 23. In this case, in which the block of rubber like material is applied, the volumes in the four representative states indicated by V0, V1, V2 and V3, are the same, in other words we get the equation $$V_0=V_1=V_2=V_3$$

Figure 28:
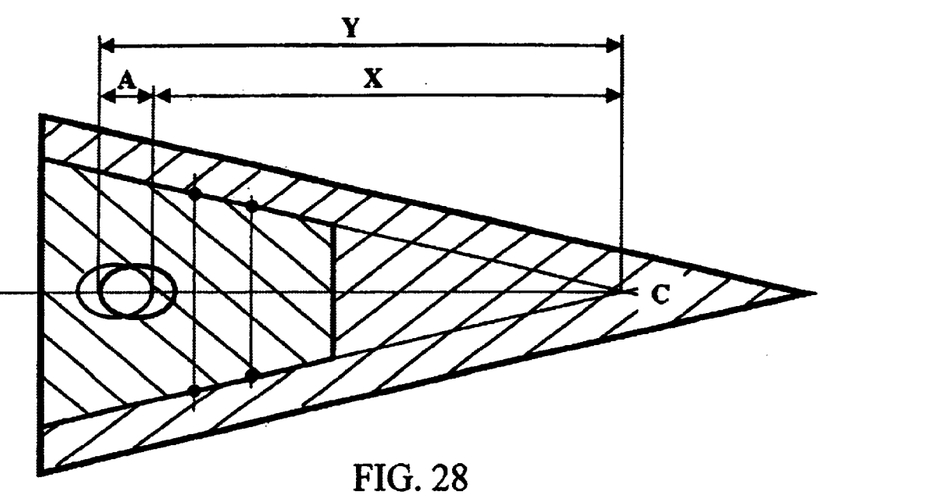
FIG. 28 shows a diagram of the arrangement of the tooth and its adapter, with the relative situation of the holes for the pin on each of these.

In FIG. 28 we can see that when a tooth is mounted on an adapter there is a space determined by the rear wall of the hole of the tooth and the front wall of the notch in the nose of the adapter. The pin should be placed in this space (A). This space has a melting tolerance. The quotas with tolerance are determined by preserving the rear wall of the hole of the tooth and the front wall of the notch in the nose of the adapter with respect to the vertex of the triangle which determines the coning of the tooth and of the nose of the adapter (C). For example:

$X$=180 mm(0; −1.5)

$Y$=200 mm(+1.5; 0)

If $Y$−$X$=$A$, then $A$=20 mm(+3; 0)

In this way the space where the pin should be placed may vary between 20 and 23 mm.

Figure 27:
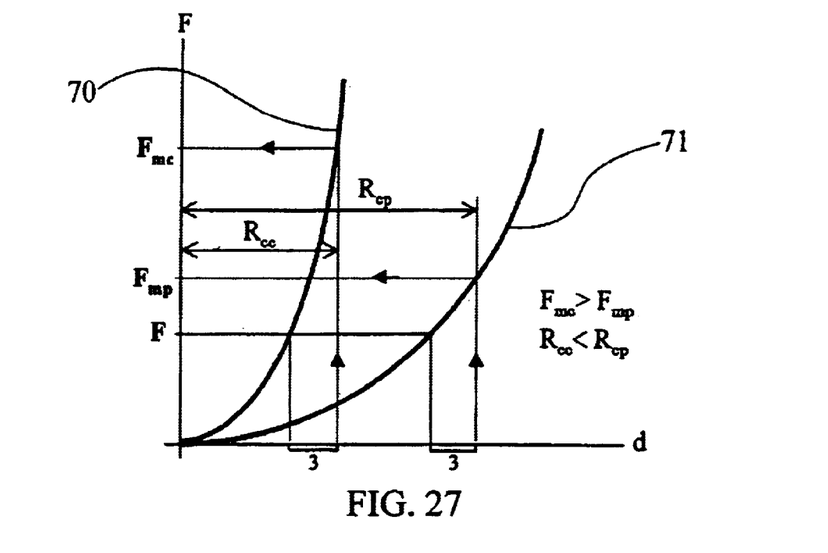
FIG. 27 shows the behaviour of an incompressible elastomer and a compressible elastomer.

In the graphic in FIG. 27 we can see the behaviour of an incompressible elastomer 70 (rubber type) and a compressible elastomer 71 within a close space, with the force represented in the y-axis and the deformations in the x-axis. Once the pin has been placed in its notch of 23 mm, it must exert a force to maintain fixed in its notch by locking the tooth (F). When the tolerance (compression of 3 mm) is applied, this force undergoes a considerable increase in the case of a pin implemented with rubber-like material ($F_{mc}$), implying a major transverse expansion. On the other hand, for a pin implemented with compressible elastomer, the force which this must make to absorb the compression is much lower ($F_{mp}$). In addition to this, the pin implemented with compressible elastomer has a greater range of compression that the pin implemented with rubber-like material, thereby making it possible to absorb the wear suffered by the nose of the adapter ($R_{cp}$>$R_{cc}$). This wear means that there is more and more play between the tooth and the adapter and as a consequence, it means the pin has to absorb this play to prevent the tooth from falling off.

Figure 29:
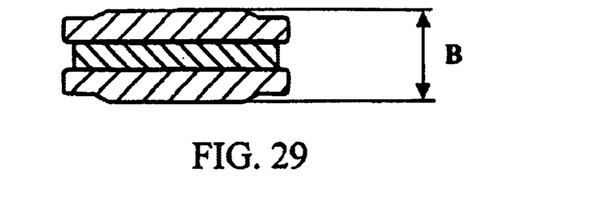
FIG. 29 shows a diagram of a pin with a reference to its width.

If the width of the pin is B, this must be compressed until it reaches A when it is placed in the notch. This means the pin must be designed in such a way that it can be placed in its notch when it is deformed, and to give it enough capacity to give the tension necessary to lock the tooth once it has been positioned. By implementing rubber-like material in the pins, the range of freedom is at a minimum level, causing one of the two facets to be sacrificed. In other words, it is either difficult to mount the pin or the fastening and tension of the pin worsens once it has been positioned. On the other hand, implementing compressible elastomers in the pins makes it possible to work with a greater melting tolerance, thereby allowing a lower dimensional precision than is the case with a pin implemented with rubber-like material and offering a much easier positioning with a better fastening. This leads to a saving in manufacturing costs; avoiding the mechanisation of possible zones and increasing the manufacturing tolerances.

Figure 19:
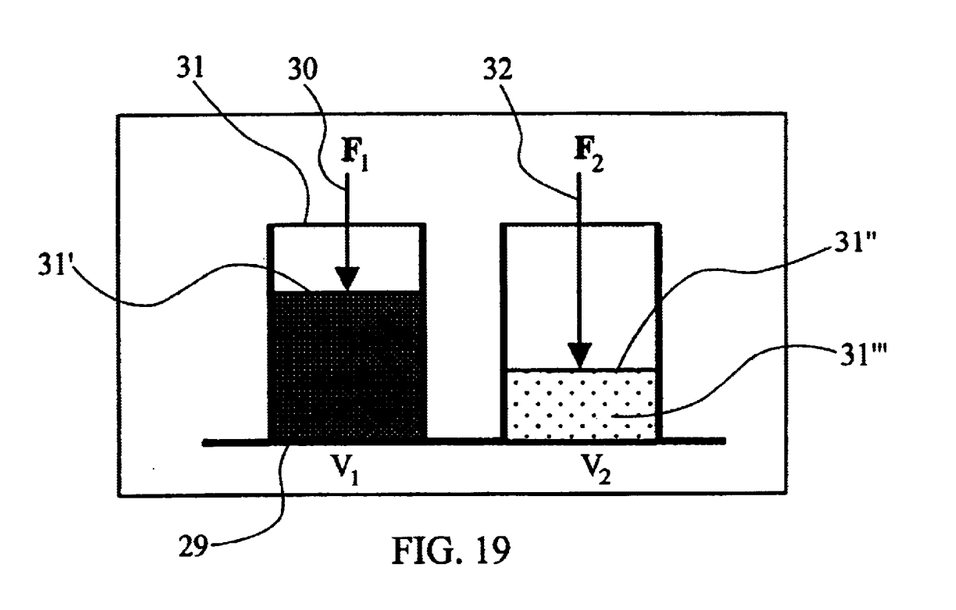
FIG. 19 contains a diagram of the behaviour of a block of rubber-like material (compact elastomer) and the behaviour of a block of compressible (or cellular) elastomer within a close space.

FIG. 19 shows a comparison between the behaviour of a rubber-like elastomer 29 and the behaviour of a compressible (or cellular) elastomer 31''' within a closed space 31. Since there is no space for the lateral expansion since the area 31 is of the closed type, the block of rubber does not deform, and so its surface 31 does not alter upon the application of a force 30 represented by the vector $F_1$. On the other hand, with the block of compressible elastomer 31, this can deform since the material is compressible and does not require transverse expansion. Therefore, the upper surface, which was initially at the same level as that of the block 29 is at the level represented by number 31" after the application of a force 32 represented by the vector F2. As an example, it can be shown that from the laboratory experiments carried out with an elastomer of cellular polyurethane with a density of 350 kg/m3 a compression of 80% with respect to the original dimensions of the component was obtained. Within a closed space such as that shown in FIG. 19, the cellular polyurethane elastomer with a density of 350 kg/M$^3$ manages to be compressed to 63% of its volume. A rubber with a hardness of 45 Shore A and with a density of 1.18 g/cm$^3$ can not be compressed.

Figure 20:
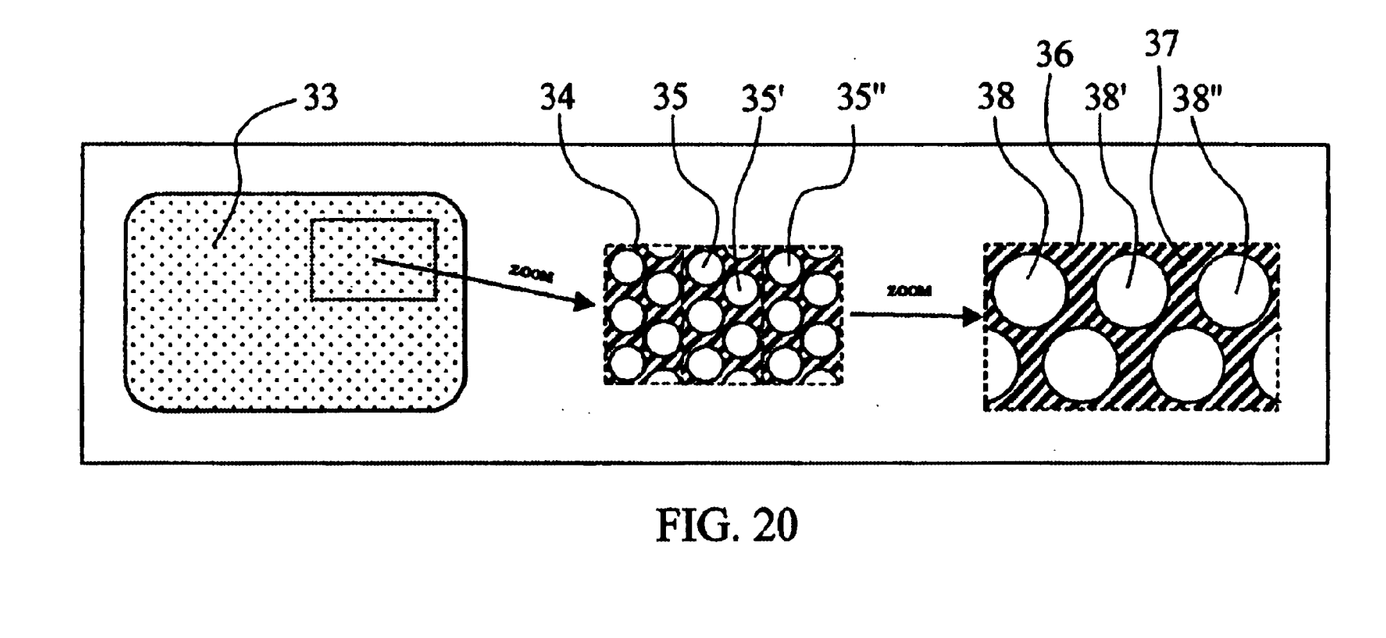
FIG. 20 shows a diagram of the constitution of a block of compressible (cellular) elastomer.

For a better understanding of this phenomenal characteristic of the behaviour of compressible (or cellular) elastomers, we can observe a block 33 of compressible (or cellular) elastomer represented by the diagram in FIG. 20, in which it is possible to appreciate in the zone represented on a greater scale 34, the existence of multiple cavities 35, 35', 35", which form closed type chambers filled with gas, which will be carbon dioxide in most cases. However, it will be understood, that an equally satisfactory functioning can be achieved with other types of synthetic resins possessing a certain degree of elasticity, which contained a gas other than $CO_2$ in the closed cells which this gas constitutes in the mass of the elastomer. In this respect, it will be understood that since we are dealing with cavities full of a gas generated in the actual manufacturing or treatment of the material, the form of these will be noticeably spherical. In FIG. 20 itself, we can see another zone 36 of the actual block 33, on a larger scale where we can appreciate the structural material 37 formed preferably by a synthetic elastomer and the cavities 38, 38', 38" of gas closed in their interior, in such a way that the structural material completely surrounds and separates these gas-filled cavities.

Figure 21:
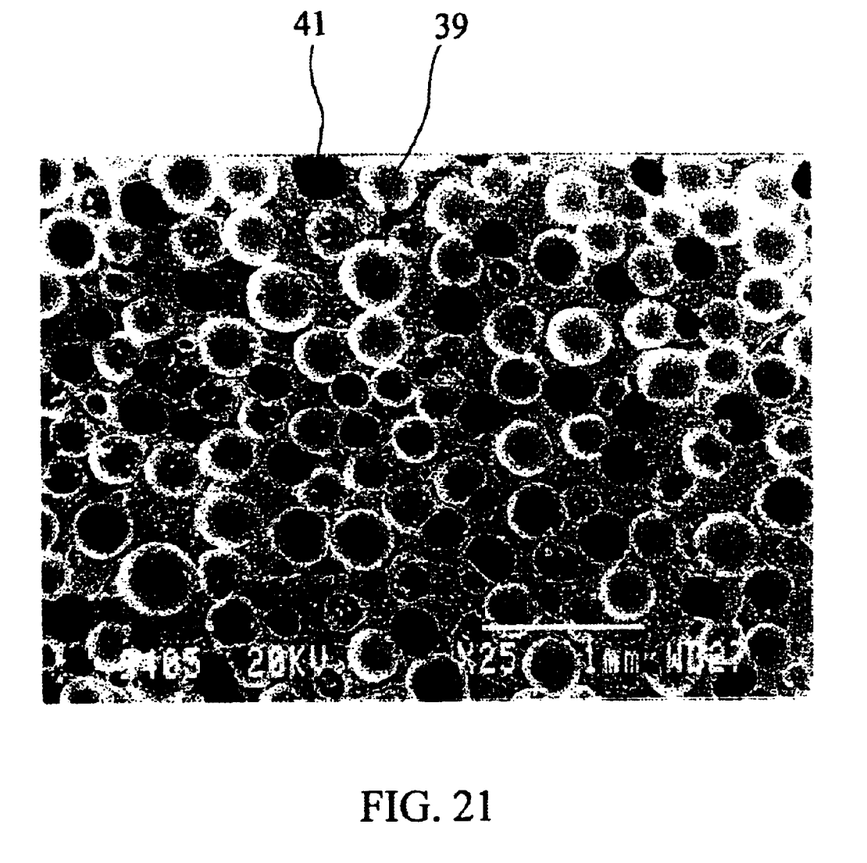
FIG. 21 shows a view that has been magnified 37 times showing a block of elastomer of the type used in this invention.
Figure 22:
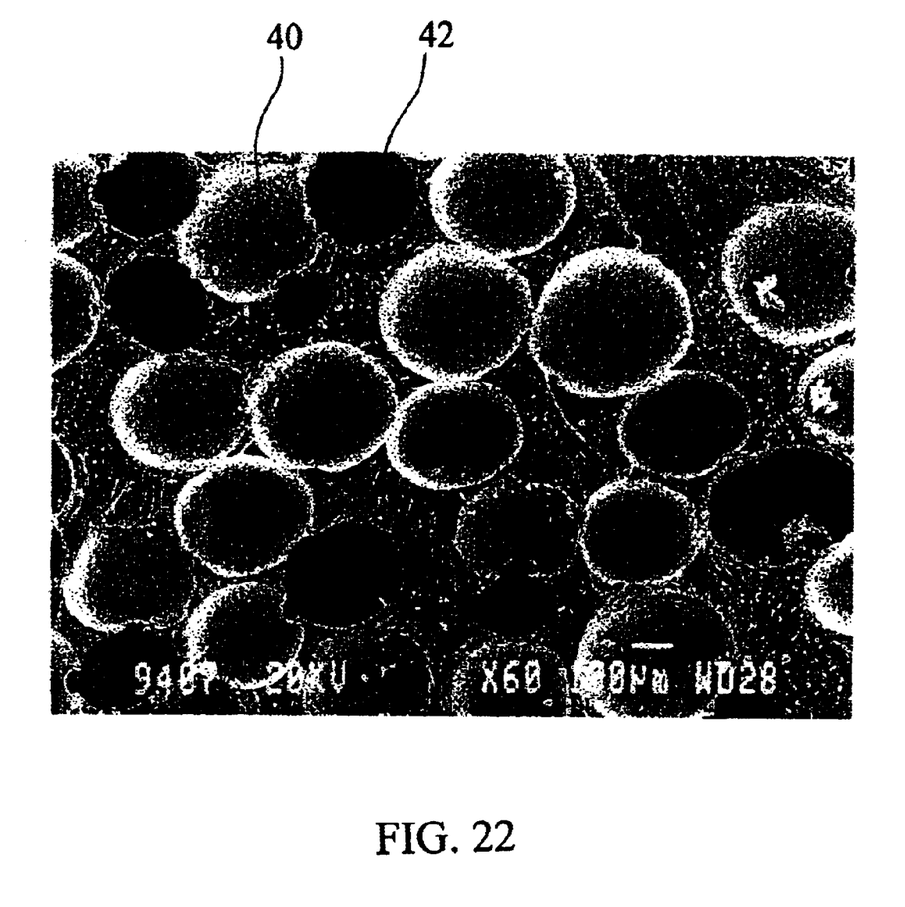
FIG. 22 shows a section of a block of elastomer according to the invention magnified about 90 times.

In FIGS. 21 and 22, each show sectional views of the real blocks of cellular elastomers magnified about 37 to 90 times. In these photographic views, the cavities are represented by the different spheres with a slightly lighter outline such as those indicated by numbers 39 and 40 respectively in these figures. The darker and noticeably circular shapes such as 41 and 42 respectively and correspond to cavities that have been cut on top of their medium plane, with the background remaining dark.

From the point of view of the invention we are considering here it is preferable that cellular polyurethane elastomers have densities of between 200 and 1,000 kg/M3 approximately.

Likewise, the percentage of the volume occupied by the cavities with respect to the total volume of the block of cellular polyurethane, remains at between 30% and 90% approximately, that is to say, the volume occupied by the sum of the different cavities with respect to the total volume of the block will oscillate between 30% and 90%.

Another additional advantage of this invention is based on the fact that when a cellular polyurethane elastomer is used, a material is obtained which, unlike the rubbers that are currently used, is resistant to oil, fats, and aliphatic hydrocarbons, thus providing an improved resistance as it ages.

Likewise, the new materials applied to the retention elements of the type foreseen in this invention show an improved behaviour with regard to the deformation that remains after compression. In this way, for example, the cellular polyurethane elastomers when subjected to the same deformation force during 22 hours at a temperature of 70° C., have a remaining deformation of between approximately 4% and 7%, while in the same conditions, a rubber-type elastomer has a remaining deformation of between approximately 30% and 40%.

The structural material of a compressible (cellular) elastomer can be a terpolymer of ethylene-propylene-diene (EPDM), polychloroprene, styrene-butadiene rubber (SBR), polyvinyl chloride (PVC), polyolefins . . . Although the structural material that currently has the best mechanical properties for the application related to this invention is polyurethane.

On the basis of the foregoing, it can be seen that the essence of the invention will involve placing one or various blocks of an elastomer material between the metal piece or pieces of a retention or tension device, irrespective of whether these are joined to these or not, and which consists of a structural material or a matrix of an elastic-type material, preferably synthetic, which contains in its mass a large quantity of small cavities or closed cells, generally separated from each other and full of a gas susceptible to compression when a compression of the elastomer block takes place, and which show a minimum deformation in directions that are traversal to the force on the elastomer.

This invention, since it introduces blocks of cellular material with a matrix or structural material of a synthetic and elastic type and multiple chambers full of a gas eliminates the disadvantages of the compact rubber-type elastomers that are normally used and it preserves the main advantages that these offer. The application of this invention in locking systems in the form of a block between two sandwich type metal support pieces, or as a tensor or retainer allows these elements to absorb major forces, offering a very reduced transverse expansion and a greater resistance to the flexion/torsion, and practically eliminating the possibility of breakage or loss of the lock element. Likewise, a greater level of resistance is achieved upon ageing and a better response to the deformation forces. At the same time, the mounting is easier, since the lock elements, for example, the pins, offer a greater elastic behaviour compared to those that currently implement compact elastomers and the deterioration suffered is eliminated by the elastomer material. Likewise, we must include among the advantages of the application of this invention the possibility of a variation within wide limits of the characteristics of the material to adapt it to specific applications, acting by means of additives to achieve a better mechanical resistance to abrasion or to oils and environmental agents or varying the density and/or the volume occupied by the cavities containing gas to adapt the lock element to specific work characteristics.

As long as this does not affect, change, or modify the essence of the improvements described, it will be variable to the effects of this invention, within the scope of the appended claims.

What is claimed is:

1. A lock and retention element for use in attaching a tooth to an excavator bucket, said lock and retention element comprising:
  at least one metal element; and
  at least one block of elastomer material;
  wherein said at least one block of elastomer material is made up of an elastic structure containing multiple internal cavities in the form of closed, spherical, gas-filled cells, so that when said at least one metal element exercises a compressional force on said at least one block of elastomer material, the resulting expansion of each elastomer material is minimized in a direction transverse to each metal element.

2. A lock and retention element as claimed in claim 1, wherein the elastomer material is a polyurethane resin.

3. A lock and retention element as claimed in claim 1, wherein the gas compressed in the cells, which are generally separated from each other, is carbon dioxide.

4. A lock and retention element as claimed in claim 1, wherein the elastomer material is a cellular polyurethane with a density of between 200 and 1000 kg/m3.

5. A lock and retention element as claimed in claim 1, wherein the elastomer material is a cellular polyurethane, and the volume of the cells is between 30% and 90% with respect to the total volume of the elastomer material.

6. A lock and retention element as claimed in claim 1, wherein the compressed elastomer material shows a residual deformation to compression of between 2% and 10% at a temperature of 70° C.

7. A lock and retention element as claimed in claim 1, wherein the elastomer material is EPDM (terpolymer of ethylene-propylene-diene).

8. A lock and retention element as claim in claim 1, wherein the elastomer material is a polychloroprene.

9. A lock and retention element as claimed in claim 1, wherein the elastomer material is SBR (styrenebutadiene rubber).

10. A lock and retention element as claimed in claim 1, wherein the elastomer material is PVC (polyvinyl chloride).

11. A lock and retention element as claimed in claim 1, wherein the elastomer material is made up of polyolefins.

12. An excavator bucket having a lock and retention element for attaching a tooth to the excavator bucket, said lock and retention element comprising:

at least one metal element; and at least one block of elastomer material;

wherein said at least one block of elastomer material is made up of an elastic structure containing multiple internal cavities in the form of closed, spherical, gas-filled cells, so that when said at least one metal element exercises a compressional force on said at least one block of elastomer material, the resulting expansion of each elastomer material is minimized in a direction transverse to each metal element.

13. The excavator bucket as claimed in claim 12, wherein the elastomer material is a polyurethane resin.

14. The excavator bucket as claimed in claim 12, wherein the gas compressed in the cells, which are generally separated from each other, is carbon dioxide.

15. The excavator bucket as claimed in claim 12, wherein the elastomer material is a cellular polyurethane with a density of between 200 and 1000 kg/m3.

16. The excavator bucket as claimed in claim 12, wherein the elastomer material is a cellular polyurethane, and the volume of the cells is between 30% and 90% with respect to the total volume of the elastomer material.

17. The excavator bucket as claimed in claim 12, wherein the compressed elastomer material shows a residual deformation to compression of between 2% and 10% at a temperature of 70° C.

18. The excavator bucket as claimed in claim 12, wherein the elastomer material is EPDM (terpolymer of ethylene-propylene-diene).

19. The excavator bucket as claim in claim 12, wherein the elastomer material is a polychloroprene.

20. The excavator bucket as claimed in claim 12, wherein the elastomer material is SBR (styrenebutadiene rubber).

21. The excavator bucket as claimed in claim 12, wherein the elastomer material is PVC (polyvinyl chloride).

22. The excavator bucket as claimed in claim 12, wherein the elastomer material is made up of polyolefins.

* * * * *